(12) United States Patent
Eickmeyer et al.

(10) Patent No.: US 6,745,158 B1
(45) Date of Patent: Jun. 1, 2004

(54) METHOD AND DEVICE FOR DETERMINING THE LAYER THICKNESS DISTRIBUTION IN A PAINT LAYER

(75) Inventors: Dietmar Eickmeyer, Heidelberg (DE); Gunter Börner, Mühlhausen (DE)

(73) Assignee: ABB Research LTD, Zurich (CH)

( * ) Notice: Subject to any disclaimer, the term of this patent is extended or adjusted under 35 U.S.C. 154(b) by 709 days.

(21) Appl. No.: 09/630,150

(22) Filed: Jul. 31, 2000

(30) Foreign Application Priority Data

Jul. 31, 1999 (DE) .......................................... 199 36 146

(51) Int. Cl.[7] .......................... G06F 17/10; G06F 7/60; G05B 19/18; G05B 13/02; A01G 15/00
(52) U.S. Cl. ..................... 703/2; 703/6; 703/9; 239/3; 700/48; 706/23
(58) Field of Search ...................... 703/2, 6, 9; 239/3; 700/48; 706/23

(56) References Cited

U.S. PATENT DOCUMENTS

| | | | | |
|---|---|---|---|---|
| 5,456,548 A | * | 10/1995 | Smyrk et al. | 404/84.05 |
| 5,649,063 A | * | 7/1997 | Bose | 706/23 |
| 5,689,415 A | * | 11/1997 | Calotychos et al. | 700/67 |
| 6,507,803 B1 | * | 1/2003 | Eickmeyer et al. | 703/170 |

* cited by examiner

Primary Examiner—Hugh Jones
(74) Attorney, Agent, or Firm—Laurence A. Greenberg; Werner H. Stemer; Ralph E. Locher

(57) ABSTRACT

A method for determining a layer thickness distribution in a paint layer produced during paint spraying after inputting specific spraying parameters into an electrostatically based paint spraying device. A data processing device sets up and uses a phenomenological mathematical model of a quasi-stationary three-dimensional spray pattern. Specific parameters, such as an angle of rotation of electrodes and a rate of movement of the spraying device are input into the phenomenological model as fixed input parameters. In addition, real physical input parameters such as paint volume, directing air data and a voltage value, whose influence on the spraying result is not accurately known, are fed to an artificial neural network. The neural network having been previously trained using real input data such as a configuration of the spraying device, a paint type, operating parameters, and measured values of the layer thickness distribution. The neural network carries out a conversion of the input parameters into model input parameters which are fed to the phenomenological model. Spray patterns formed by the phenomenological model are integrated in a further functional unit as a function of movement data of the spraying device which are contained in the input parameters to form the overall paint layer which is output.

4 Claims, 5 Drawing Sheets

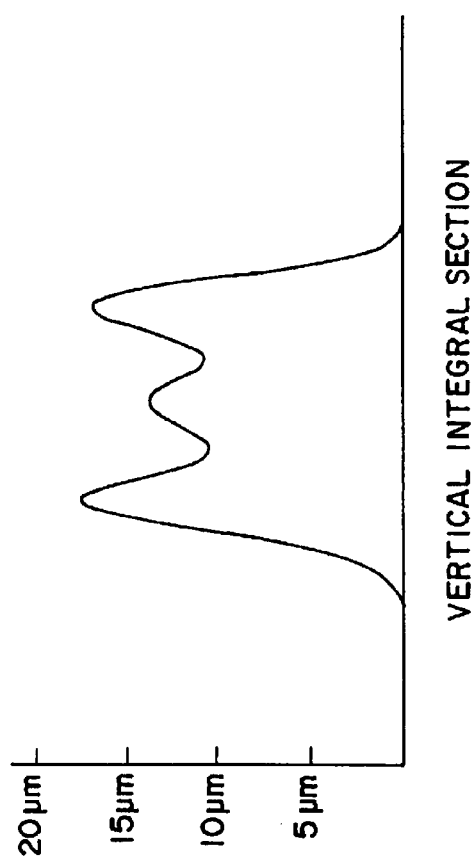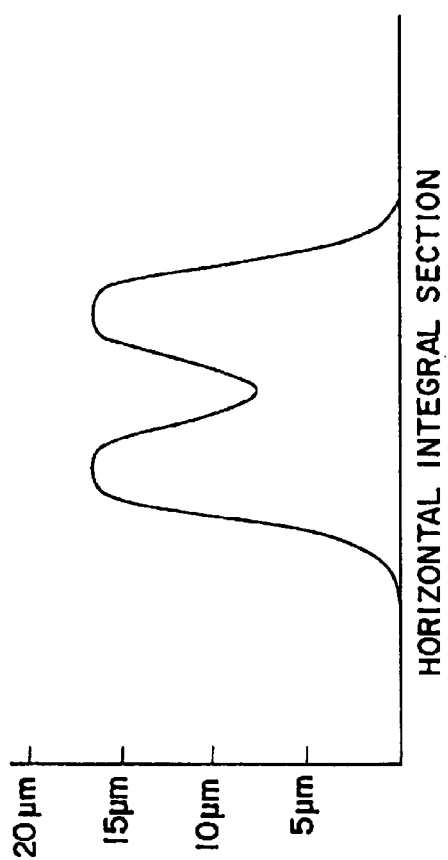

METHOD AND DEVICE FOR DETERMINING THE LAYER THICKNESS DISTRIBUTION IN A PAINT LAYER

BACKGROUND OF THE INVENTION

Field of the Invention

The invention relates to a method for determining a layer thickness distribution to be expected in a paint layer to be produced during paint spraying after inputting specific spraying parameters into an electrostatically based paint spraying device.

A known mode of procedure for an a-priori calculation of the painting result of electrostatically based painting units is based on empirical investigations with the aid of which it is possible to determine poorly founded estimated values and only very simplified mathematical descriptions for the painting result. The extreme simplifications required for this purpose, a few influences on the painting result, such as ambient temperature or the type and shape of the painting booth, also remaining unconsidered, lead to an unsatisfactory accuracy of the calculation.

Another known proposal envisages a complex physical modeling with the aid of which the very complex physical process of painting is to be simulated in accurate detail, and which is to be used to determine the painting result.

However, the complexity of the modeling is disadvantageous. Thus, a satisfactorily accurate simulation of the physical processes during the painting process and, in particular, of their effects on one another is scarcely possible, since stochastically proceeding processes (atomization, etc.) are involved. Moreover, the outlay on modeling and the true computing time of the model are also unacceptably high (days or weeks) even on computer installations currently available.

SUMMARY OF THE INVENTION

It is accordingly an object of the invention to provide a method and a device for determining the layer thickness distribution in a paint layer that overcomes the disadvantages of the prior art methods and devices of this general type, which leads to satisfactorily accurate results in conjunction with a relatively low outlay.

With the foregoing and other objects in view there is provided, in accordance with the invention, a method for determining a layer thickness distribution to be expected in a paint layer produced during paint spraying after inputting specific spraying parameters into an electrostatically based paint spraying device. The method includes providing a data processing device for setting up and using a phenomenological mathematical model of a quasi-stationary three-dimensional spray pattern. An angle of rotation of electrodes of the spraying device and a rate of movement of the spraying device are input directly into the phenomenological mathematical model as fixed input parameters. Real physical input parameters including, a paint volume, directing air data, and a voltage value, whose influence on a spraying result is not accurately known, are fed to an artificial neural network which has previously been trained using real input data including a configuration of the spraying device used, a paint type, operating parameters, and measured values of a test layer thickness distribution. The artificial neural network carries out a conversion of the real physical input parameters into model input parameters. The model input parameters are fed to the phenomenological mathematical model. The spray patterns formed by the phenomenological mathematical model are integrated in a function unit in dependence on movement data of the spraying device which are contained in input parameters to form an overall paint layer. The layer thickness distribution of the overall paint layer is then provided at an output.

In the method according to the invention, it is not the overall physical process of painting, but the painting result, without taking account of the physical processes, which is simulated with the aid of the phenomenological model. The model parameters taken into account in this case, correspond only partially to actual parameters of the painting process. The relationship between the model parameters and the real spraying parameters is produced with the aid of the artificial neural networks that are trained with the aid of real measurements.

The advantage of the method is based on the fact that complex physical modeling of the overall process is avoided. Nevertheless, results attained are realistic and, because of the use of real measured values of a training process of the artificial neural networks, take account of all relationships, that is to say also previously unknown ones.

In accordance with an added feature of the invention, there is the step of training a separate neural network for each desired model parameter. The separate neural network has only a single output and a number of input neurons which correspond to a portion of a totality of available input variables.

In accordance with an additional feature of the invention, there is the step of eliminating a parameter that is acknowledged as irrelevant when a learning process of two neural networks which differ formally only by an input parameter lead to equivalent learning results in conjunction with an otherwise identical learning data record.

In accordance with a concomitant feature of the invention, a data processing configuration is provided for determining a layer thickness distribution to be expected in a paint layer produced during paint spraying after inputting specific spraying parameters into an electrostatically based paint spraying device. The data processing configuration contains a data processing device having means for producing a phenomenological mathematical model, an artificial neural network connected to the means for producing the phenomenological mathematical model, and a functional unit connected to the means for producing the phenomenological mathematical model. The data processing device is programmed to:

set up and use the phenomenological mathematical model of a quasi-stationary three-dimensional spray pattern;

input an angle of rotation of electrodes of the spraying device and a rate of movement of the spraying device directly into the phenomenological mathematical model as fixed input parameters;

feed in real physical input parameters including, a paint volume, directing air data, and a voltage value, whose influence on a spraying result is not accurately known, to the artificial neural network which has previously been trained using real input data including a configuration of the spraying device used, a paint type, operating parameters, and measured values of a test layer thickness distribution, and the artificial neural network carries out a conversion of the real physical input parameters into model input parameters;

feed the model input parameters to the phenomenological mathematical model;

integrate spray patterns formed by the phenomenological mathematical model in the functional unit in dependence on movement data of the spraying device which are contained in input parameters to form an overall paint layer; and output the layer thickness distribution of the overall paint layer.

Other features which are considered as characteristic for the invention are set forth in the appended claims.

Although the invention is illustrated and described herein as embodied in a method and a device for determining the layer thickness distribution in a paint layer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a graph of a vertical integral section through a paint layer; and

FIG. 8 is a graph of a horizontal integral section through a paint layer.

DESCRIPTION OF THE PREFERRED EMBODIMENTS

Figure 1:
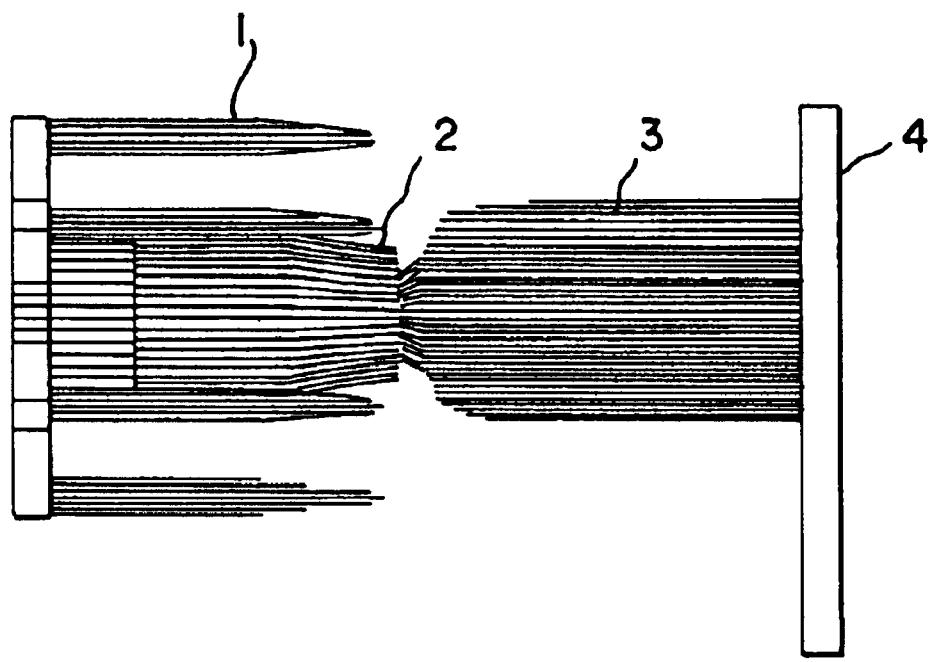
FIG. 1 shows a diagrammatic, side-elevational view of a paint spraying device and a spray cloud produced by it according to the invention.

In all the figures of the drawing, sub-features and integral parts that correspond to one another bear the same reference symbol in each case. Referring now to the figures of the drawing in detail and first, particularly, to FIG. 1 thereof, there is shown a diagrammatic illustration of a paint spraying device 2 which is configured by way of example as an atomizer ring and supplies a paint spray jet 3 or a spray cloud. Charging of the paint being performed with the aid of six high-voltage electrodes 1 that are disposed in the shape of a circle around the atomizer ring. The paint is deposited onto an object 4.

A paint layer can be produced on the object 4 by horizontal or vertical movement, also by oscillating movement of the spraying device 2 as well as by changing the distance between the spraying device 2 and object 4. A paint layer thickness distribution can be measured.

Figure 3:
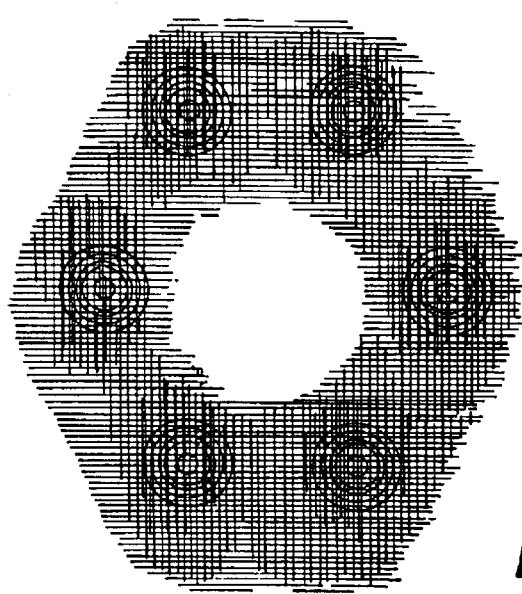
FIG. 3 is a top plan view of a stationary spray pattern.

FIG. 3 shows a top plan view of a spray pattern that can be produced with the aid of the spraying device 2 in accordance with FIG. 1, it being assumed that the spraying device 2 was not moved during the spraying operation. A paint layer with a virtually uniform thickness distribution over the painted surface can be achieved by suitable movement of the spraying device 2.

Figure 6:
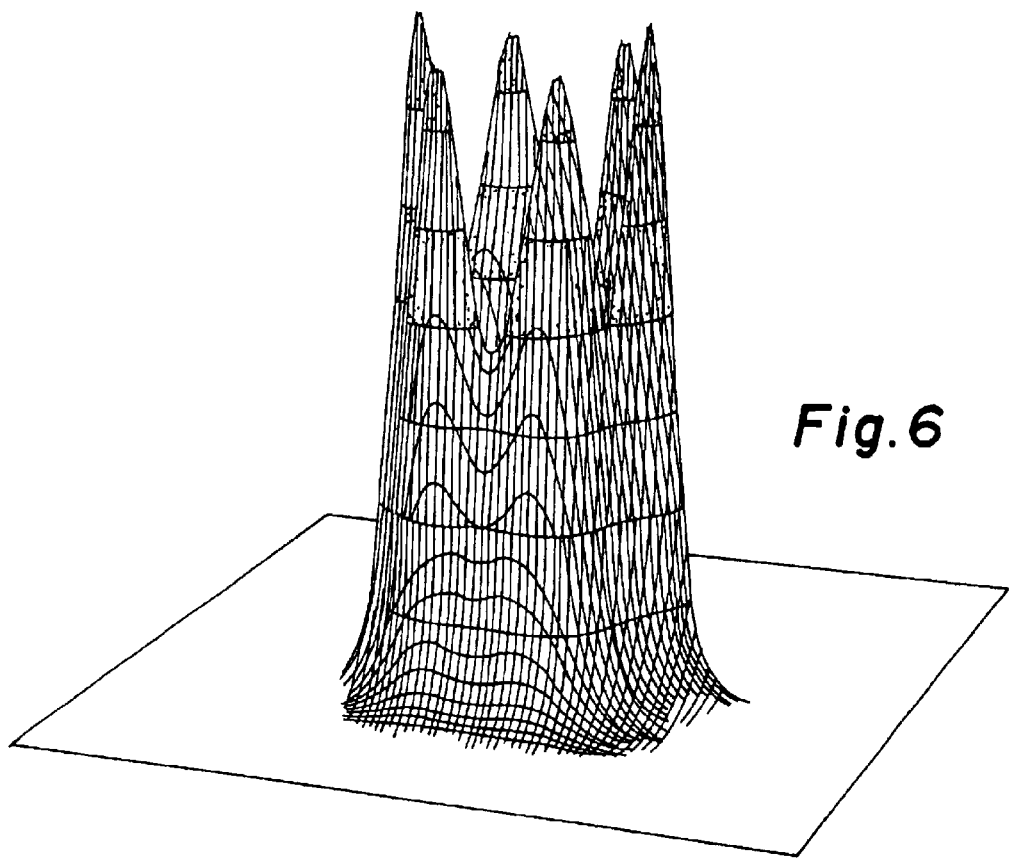
FIG. 6 is perspective view of a three-dimensional overall spray pattern.
Figure 4:
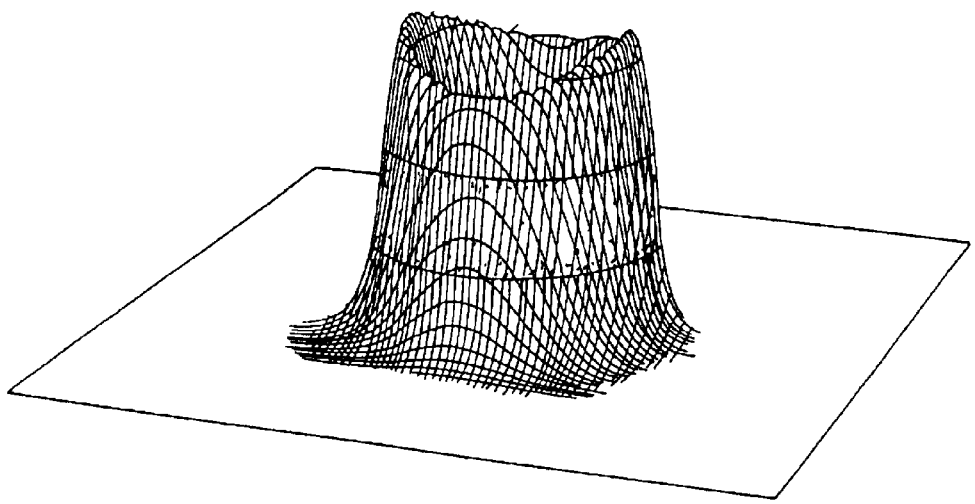
FIGS. 4 and 5 are perspective views of components of a three-dimensional stationary spray pattern.
Figure 5:
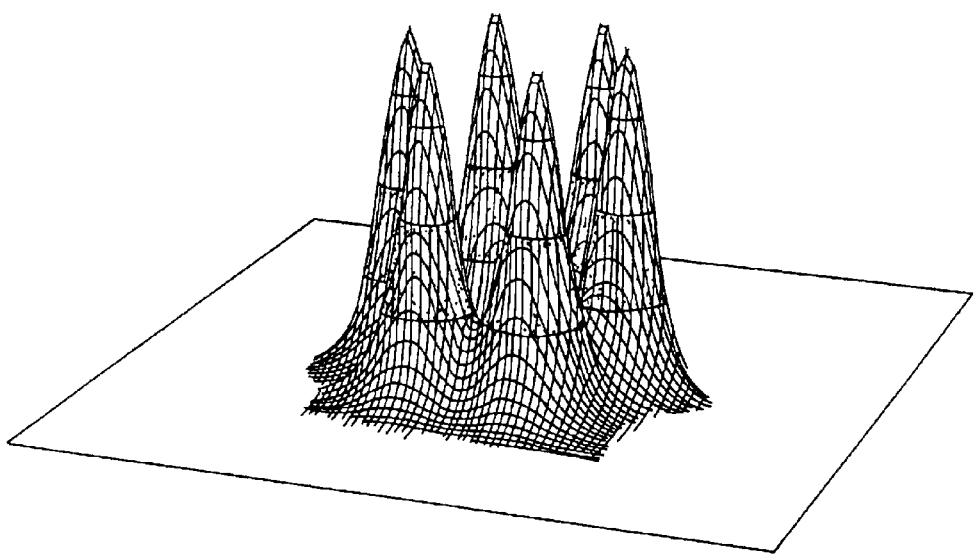

It may be seen from FIGS. 4 to 6 that a quasi-stationary spray pattern, which is shown in top view in FIG. 3 and can be produced with the aid of the embodiment of the spraying device 2 configured as described in FIG. 1 is composed of two main components. FIG. 4 shows a torus-shaped configuration with an apex of a Gaussian bell, which is situated below an edge of the atomizer ring; there is rotational symmetry about the axis of the atomizer ring. FIG. 5 shows a configuration with six bell-shaped paint deposits, which correspond to a Gaussian distribution and are respectively located, distributed in the form of a circle, on a circular segment between two of the electrodes 1 (FIG. 1).

An overall spray pattern resulting from a combination of the two components is shown in FIG. 6.

Figure 2:
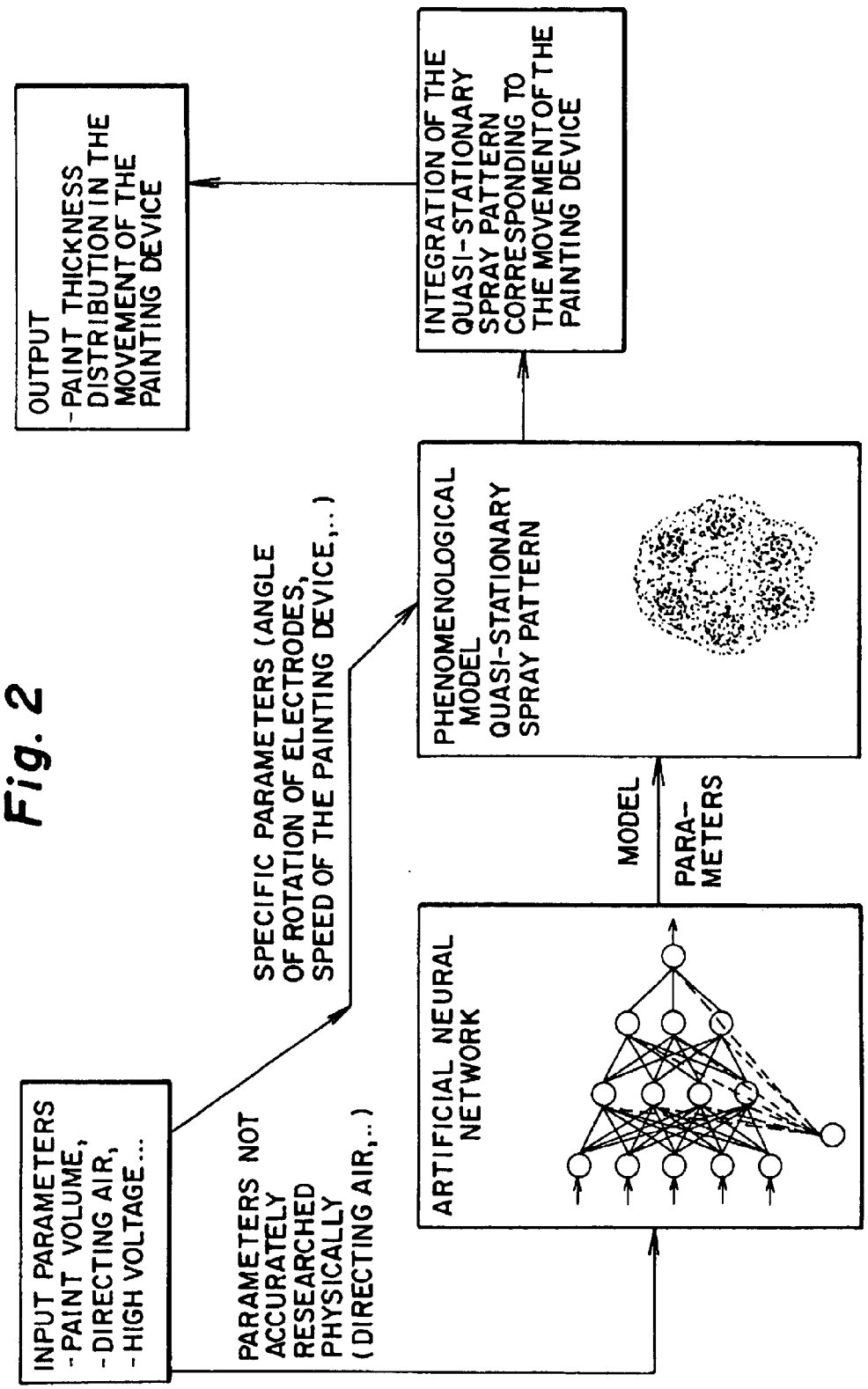
FIG. 2 is block diagram of a data processing unit performing method steps according to the invention.

FIG. 2 shows a data processing device 10 for performing the method. The method is based on simulating a 3-dimensional, quasi-stationary spray pattern, that is to say the paint distribution below a fixed applicator, for example of the spraying device 2 described. Such a spray pattern is illustrated by way of example in FIG. 6. Basic components, illustrated by way of example in FIGS. 4 and 5, can be "non-symmetrically" configured by suitable correction factors, in order to be able to describe the influence of parameters such as gravity or airflow on the painting result. It is also possible to introduce further components.

The spray pattern shown FIG. 3 can be described by the below listed parameters;

a) the radius of the torus-shaped configuration below the atomizer ring;

b) the paint volume of the torus-shaped configuration below the atomizer ring;

c) the non-symmetry of the torus-shaped configuration below the atomizer ring;

d) the dispersion of the Gaussian bell by the rotation of which the torus-shaped configuration is formed;

e) the number of electrodes;

f) the arrangement radius of the electrodes;

g) the paint volume of the Gaussian bells between the electrodes;

h) the level of non-symmetry of the Gaussian bells between the electrodes; and i) the dispersion of the Gaussian bell between the electrodes, angle of rotation of the electrodes.

Further parameters are conceivable.

Also to be kept in mind is that the volume of the 3-dimensional spray pattern must correspond to the actual paint throughput of the real arrangement (linear scaling); and some parameters such as, for example, the number of electrodes that are incorporated into the method as a fixed value.

The result of such a calculation of the spray pattern is to be stored in a 2-dimensional variable in the case of implementation using the data processing device 10. The two dimensions correspond to a base area of the quasi-stationary spray pattern, and a value of respective variables corresponding to an associated height of the paint (compare FIG. 6).

It may be gathered from FIG. 2 that the data processing unit 10 sets up and uses a phenomenological model of the spray pattern in a means for forming the phenomenological model 13. Such a model is simpler than a model that describes the physical relationships.

A portion of input parameters received at an input 11 can be fed to the model directly as fixed values. Another portion of the input parameters, whose influence cannot be described exactly, is fed to an artificial neural network 12 that supplies additional model parameters. Taking account of a prescribed movement of the spraying device 2 by integrating the quasi-stationary spray pattern produces a realistic image of the paint thickness distribution to be expected during paint spraying.

A 3-dimensional spray pattern can be determined during movement of the painting device 2 by integration of the area content of a cut surface through the quasi-stationary spray pattern during movement of the painting device 2 at a linear speed in a functional unit being an integration unit 14. The cut surface is aligned in a fashion corresponding to the direction of movement of the painting device 2. FIG. 7 shows by way of example a section through a paint layer formed by vertical movement of the spraying device 2. FIG. 8 shows a corresponding layer thickness distribution, which is produced by horizontal movement of the spraying device 2. The final paint thickness distribution is provided at output 15.

Fictitious movement of the quasi-stationary spray pattern of the base area (n×n) inside a 2-dimensional base area (a×b, a>n, b>n) at fictitious equidistant time intervals. The numerical values at the relevant coordinates of the (a×b) area above which the (n×n) area is currently located are increased in accordance with the required speed of movement and in accordance with the position of the quasi-stationary spray pattern.

The use of the artificial neural networks 12 for converting the real input parameters of the physical arrangement into model parameters requires the artificial neural networks 12 to be trained by inputting real measured data before being used.

Real input parameters for the neural networks 12 are as follows in the case of the basic spraying device 2 used here by way of example:

a) the nature of the paint, b) the paint volume per unit of time, c) the speed of the painting device, d) the type of paint, e) the directing air data, f) the air control data, g) the voltage, h) the temperature, i) the rate of rotation of the atomizer ring, j) the type of painting booth, and k) the configuration of the applicator (for example, the number of the electrodes 1, radius of the atomizer ring).

Output variables of the neural networks 12 are model parameters that can be combined with direct input parameters.

The neural networks 12 are very suitable for assignment functions whose physical background cannot be accurately described (black-box-model). The multi-layer perceptron type of neural networks 12 is to be seen as a suitable one. The structure of the neural network 12 is now described. A number of input neurons should correspond to a number of the physical input parameters considered, as described above, but it is to be regarded as a variable within wide limits (elimination of irrelevant input parameters). A number of output neurons should correspond to a number of the desired model parameters.

It can prove to be sensible to train for each desired model parameter a separate neural network 12 which has only a single output and a number of input neurons which corresponds to a portion of the totality of the input variables available.

The number of hidden layers between input and output neurons can vary from zero to, sensibly, 2.

Other types of neural network are likewise conceivable.

For the purpose of training such a network, it is sensible to use a supervised learning method, for example backpropagation, which determines the parameters of the neural network with the aid of a suitable number of corresponding input and output vectors (in this case, "vector" refers to the juxtaposition of the desired input and/or output variables).

The generation of the learning data record, which contains an appropriate number of such corresponding vectors, is to be carried out with the aid of real measurements.

The following procedure is adopted here:

a) a number of C spray patterns whose properties lie within a physically sensible region are generated while the direct input parameters vary;

b) a number of D<C real measurements are available;

c) the most similar (minimum quadratic deviation) simulation c from C is determined for each individual measurement d from D, the relationship between real parameters of the painting device and model parameters being given, exactly 1 c from C is determined for each d from D; and d) the D value pairs found are to be written in suitable form and sequence into the learning data record.

When the learning processes of two neural networks which differ formally from one another only by one input parameter lead to equivalent learning results (cumulated errors) in conjunction with an otherwise identical learning data record (only one parameter is not taken into account), the parameter concerned can be recognized as irrelevant.

We claim:

1. A method for determining a layer thickness distribution to be expected in a paint layer produced during paint spraying after inputting specific spraying parameters into an electrostatically based paint spraying device, which comprises the steps of:

providing a data processing device performing the steps of:

setting up and using a phenomenological mathematical model of a quasi-stationary three-dimensional spray pattern;

inputting an angle of rotation of electrodes of the spraying device and a rate of movement of the spraying device directly into the phenomenological mathematical model as fixed in put parameters;

feeding in real physical input parameters including, a paint volume, directing air data, and a voltage value, whose influence on a spraying result is not accurately known, to an artificial neural network which has previously been trained using real input data including a configuration of the spraying device used, a paint type, operating parameters, and measured values of a test layer thickness distribution, and the artificial neural network carries out a conversion of the real physical input parameters into model input parameters;

feeding the model input parameters to the phenomenological mathematical model;

integrating spray patterns formed by the phenomenological mathematical model in a function unit in dependence on movement data of the spraying device which are contained in input parameters to form an overall paint layer; and outputting the layer thickness distribution of the overall paint layer.

2. The method according to claim 1, which comprises training a separate neural network for each desired model parameter, the separate neural network has only a single output and a number of input neurons which correspond to a portion of a totality of available input variables.

3. The method according to claim 2, which comprises eliminating a parameter that is acknowledged as irrelevant when a learning process of two neural networks which differ formally only by an input parameter lead to equivalent learning results in conjunction with an otherwise identical learning data record.

4. A data processing configuration for determining a layer thickness distribution to be expected in a paint layer produced during paint spraying after inputting specific spraying parameters into an electrostatically based paint spraying device, the data processing configuration comprising:

a data processing device having means for producing a phenomenological mathematical model, an artificial neural network connected to said means for producing the phenomenological mathematical model, and a functional unit connected to said means for producing the phenomenological mathematical model, said data processing device programmed to:

set up and use the phenomenological mathematical model of a quasi-stationary three-dimensional spray pattern;

input an angle of rotation of electrodes of the spraying device and a rate of movement of the spraying device directly into the phenomenological mathematical model as fixed input parameters;

feed in real physical input parameters including, a paint volume, directing air data, and a voltage value, whose influence on a spraying result is not accurately known, to said artificial neural network which has previously been trained using real input data including a configuration of the spraying device used, a paint type, operating parameters, and measured values of a test layer thickness distribution, and said artificial neural network carries out a conversion of the real physical input parameters into model input parameters;

feed the model input parameters to the phenomenological mathematical model;

integrate spray patterns formed by the phenomenological mathematical model in said functional unit in dependence on movement data of the spraying device which are contained in input parameters to form an overall paint layer; and out put the layer thickness distribution of the overall paint layer.

* * * * *